(12) United States Patent
Yamamoto et al.

(10) Patent No.: US 7,919,208 B2
(45) Date of Patent: Apr. 5, 2011

(54) ANODE ACTIVE MATERIAL AND BATTERY

(75) Inventors: Takeru Yamamoto, Fukushima (JP);
Tomoyuki Nakamura, Fukushima (JP);
Yuji Uchida, Fukushima (JP); Yukifumi Takeda, Fukushima (JP); Takehiko Suwa, Fukushima (JP); Gentaro Kano, Kanagawa (JP); Takahiro Endo, Fukushima (JP)

(73) Assignee: Sony Corporation, Tokyo (JP)

( * ) Notice: Subject to any disclaimer, the term of this patent is extended or adjusted under 35 U.S.C. 154(b) by 1196 days.

(21) Appl. No.: 11/553,336

(22) Filed: Oct. 26, 2006

(65) Prior Publication Data

US 2007/0117015 A1    May 24, 2007

(30) Foreign Application Priority Data

Oct. 31, 2005    (JP) .............................. P2005-315877

(51) Int. Cl.
*H01M 4/58* (2010.01)
*H01M 4/583* (2010.01)
*H01M 6/18* (2010.01)

(52) U.S. Cl. ................. 429/231.8; 429/316; 429/317
(58) Field of Classification Search .............. 429/231.8, 429/316, 127, 308, 317; 29/623.1
See application file for complete search history.

(56) References Cited

U.S. PATENT DOCUMENTS

| | | | |
|---|---|---|---|
| 2,647,938 A * | 8/1953 | Taylor | 429/303 |
| 6,344,296 B1 * | 2/2002 | Ishii et al. | 429/231.8 |
| 6,558,438 B1 * | 5/2003 | Satoh et al. | 29/623.1 |
| 6,590,625 B1 | 7/2003 | Umemoto et al. | |
| 2004/0166414 A1 | 8/2004 | Omaru et al. | |

FOREIGN PATENT DOCUMENTS

| | | | |
|---|---|---|---|
| JP | 6-111818 | | 4/1994 |
| JP | 8-24637 | | 1/1996 |
| JP | 08083608 A | * | 3/1996 |
| JP | 09245790 A | * | 9/1997 |
| JP | 10-330107 | | 12/1998 |
| JP | 3067080 | | 5/2000 |
| JP | 2001-185149 | | 7/2001 |

(Continued)

OTHER PUBLICATIONS

Machine Translation of JP 08083608A, Nose et al., Mar. 1996.*

(Continued)

*Primary Examiner* — Jonathan Crepeau
*Assistant Examiner* — Kenneth Douyette
(74) *Attorney, Agent, or Firm* — K&L Gates LLP (57) ABSTRACT

A battery capable of obtaining a high capacity and reducing its expansion is provided. A spirally wound electrode body formed through laminating a cathode and an anode with a separator and an electrolyte in between to form a laminate and spirally winding the laminate is included in a package member made of an aluminum laminate film. An anode active material layer includes an agglomerated graphite material in which a plurality of primary particles made of graphite having fine pores are agglomerated so that the orientation planes thereof are not parallel to each other, at least in part, to form secondary particles. In the agglomerated graphite material, the total volume of fine pores with a diameter from 10 nm to $1 \times 10^5$ nm inclusive estimated by mercury porosimetry ranges from 0.5 cm³/g to 1.5 cm³/g inclusive per unit weight.

14 Claims, 2 Drawing Sheets

FOREIGN PATENT DOCUMENTS

| | | |
|---|---|---|
| JP | 2001-196095 | 7/2001 |
| JP | 321661 | 8/2001 |
| JP | 3253185 | 11/2001 |
| JP | 2002-8655 | 1/2002 |
| JP | 2004-87437 | 3/2004 |
| JP | 2004-095426 | 3/2004 |
| JP | 2005-108858 | 4/2005 |
| WO | 98/00876 | 1/1998 |

OTHER PUBLICATIONS

English Abstract of JP 08083608A, Nose et al., Mar. 1996.*
Machine translation of JP 09245790 A, Tsuchiya et al., Sep. 1997.*
Abstract of JP 09245790 A, Tsuchiya et al., Sep. 1997.*
Japanese Search Report for corresponding Application No. 2005-315877, dated Sep. 24, 2009.

* cited by examiner

ANODE ACTIVE MATERIAL AND BATTERY

CROSS REFERENCES TO RELATED APPLICATIONS

The present application claims priority to Japanese Patent Application JP 2005-315877 filed in the Japanese Patent Office on Oct. 31, 2005, the entire contents of which is being incorporated herein by reference.

BACKGROUND

The present disclosure relates to an anode active material including graphite, and a battery using the anode active material.

In recent years, portable electronic devices such as camcorders, cellular phones and portable computers have emerged, and the portable electronic devices have been reduced in size and weight. Accordingly, batteries, specifically secondary batteries have been actively developed as portable power sources for the electronic devices. Among them, a lithium-ion secondary battery has been a focus of attention as a battery capable of achieving a high energy density.

However, in the lithium-ion secondary battery, the voltage is high, and the oxidation potential of a cathode is very noble, and the reduction potential of an anode is very base, so a nonaqueous solvent used for an electrolyte solution is decomposed as a side reaction except for battery reactions to generate a gas. Therefore, it has been considered that as a gas absorbing material, a carbon material having a high specific surface area is included in any batteries including primary batteries and secondary batteries (for example, refer to Japanese Patent No. 3067080 and Japanese Unexamined Patent Application Publication No. H8-24637). Moreover, it has been considered that a mixture of a plurality of carbon materials is used, although the mixture is not used as a gas absorbing material (for example, refer to Japanese Patent No. 3216661, and Japanese Unexamined Patent Application Publication Nos. H6-111818, 2001-196095, 2002-8655 and 2004-87437).

SUMMARY

However, when activated carbon having a high gas absorption capacity is added in a battery, a side reaction occurs in the battery to cause a decline in battery characteristics such as capacity.

In view of the foregoing, it is desirable to provide an anode active material and a battery capable of obtaining a high capacity and reducing its expansion.

According to an embodiment, there is provided an anode active material including: an agglomerated graphite material in which a plurality of primary particles made of graphite having fine pores are agglomerated so that the orientation planes thereof are not parallel to each other at least in part to form secondary particles, and in which the total volume of fine pores with a diameter from 10 nm to $1\times10^5$ nm inclusive estimated by mercury porosimetry is within a range from 0.5 cm$^3$/g to 1.5 cm$^3$/g inclusive per unit weight.

According to an embodiment, there is provided a battery including: a cathode; an anode; and an electrolyte, wherein the anode includes an agglomerated graphite material in which a plurality of primary particles made of graphite having fine pores are agglomerated so that the orientation planes thereof are not parallel to each other at least in part to form secondary particles, and in the agglomerated graphite material, the total volume of fine pores with a diameter from 10 nm to $1\times10^5$ un inclusive estimated by mercury porosimetry is within a range from 0.5 cm$^3$/g to 1.5 cm$^3$/g inclusive per unit weight.

The anode active material and the battery according to an embodiment includes an agglomerated graphite material in which a plurality of primary particles made of graphite having fine pores are agglomerated so that the orientation planes thereof are not parallel to each other to form secondary particles, and the total volume of fine pores with a diameter from 10 nm to $1\times10^5$ nm inclusive is within a range from 0.5 cm$^3$/g to 1.5 cm$^3$/g inclusive per unit weight, so the capacity can be improved, and a gas generated by a side reaction can be absorbed so as to reduce expansion.

Other and further objects, features and advantages will be apparent from the following description.

Additional features and advantages are described herein, and will be apparent from, the following Detailed Description and the figures.

DETAILED DESCRIPTION

A preferred embodiment is described in detail below with reference to the accompanying drawings.

Figure 1:
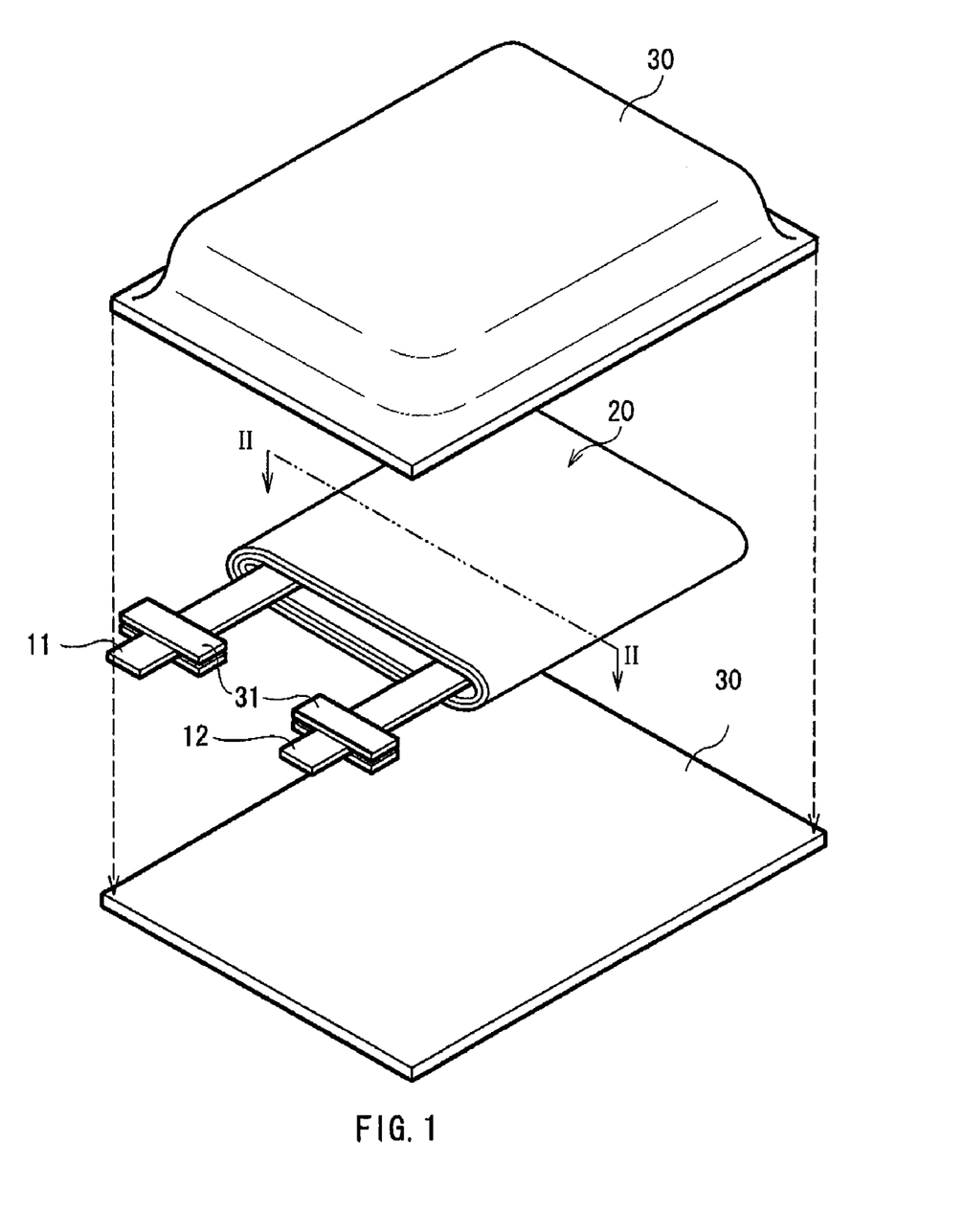
FIG. 1 is an exploded perspective view of a secondary battery according to an embodiment.

FIG. 1 shows the structure of a secondary battery according to an embodiment. The secondary battery uses lithium as an electrode reactant, and includes a spirally wound electrode body 20 to which a cathode terminal 11 and an anode terminal 12 are attached in film-shaped package members 30.

The cathode terminal 11 and the anode terminal 12 are drawn from the interiors of the package members 30 to outside, for example, in the same direction. The cathode terminal 11 and the anode terminal 12 are made of, for example, a metal material such as aluminum, copper (Cu), nickel (Ni) or stainless in a sheet shape or a mesh shape.

The package members 30 are made of, for example, rectangular aluminum laminate films including a nylon film, aluminum foil and a polyethylene film which are bonded in this order. The package members 30 are disposed so that the polyethylene film of each of the package members 30 faces the spirally wound electrode body 20, and edge portions of the package members 30 are adhered to each other by fusion bonding or an adhesive. An adhesive film 31 is inserted between the package members 30 and the cathode terminal 11 and the anode terminal 12 for preventing the entry of outside air. The adhesive film 31 is made of, for example, a material having adhesion to the cathode terminal 11 and the anode terminal 12, for example, a polyolefin resin such as polyethylene, polypropylene, modified polyethylene or modified polypropylene.

In addition, the package members 30 may be made of another aluminum laminate film in which aluminum foil is sandwiched between polymer films, a laminate film with any other structure, a polymer film such as polypropylene, or a metal film.

Figure 2:
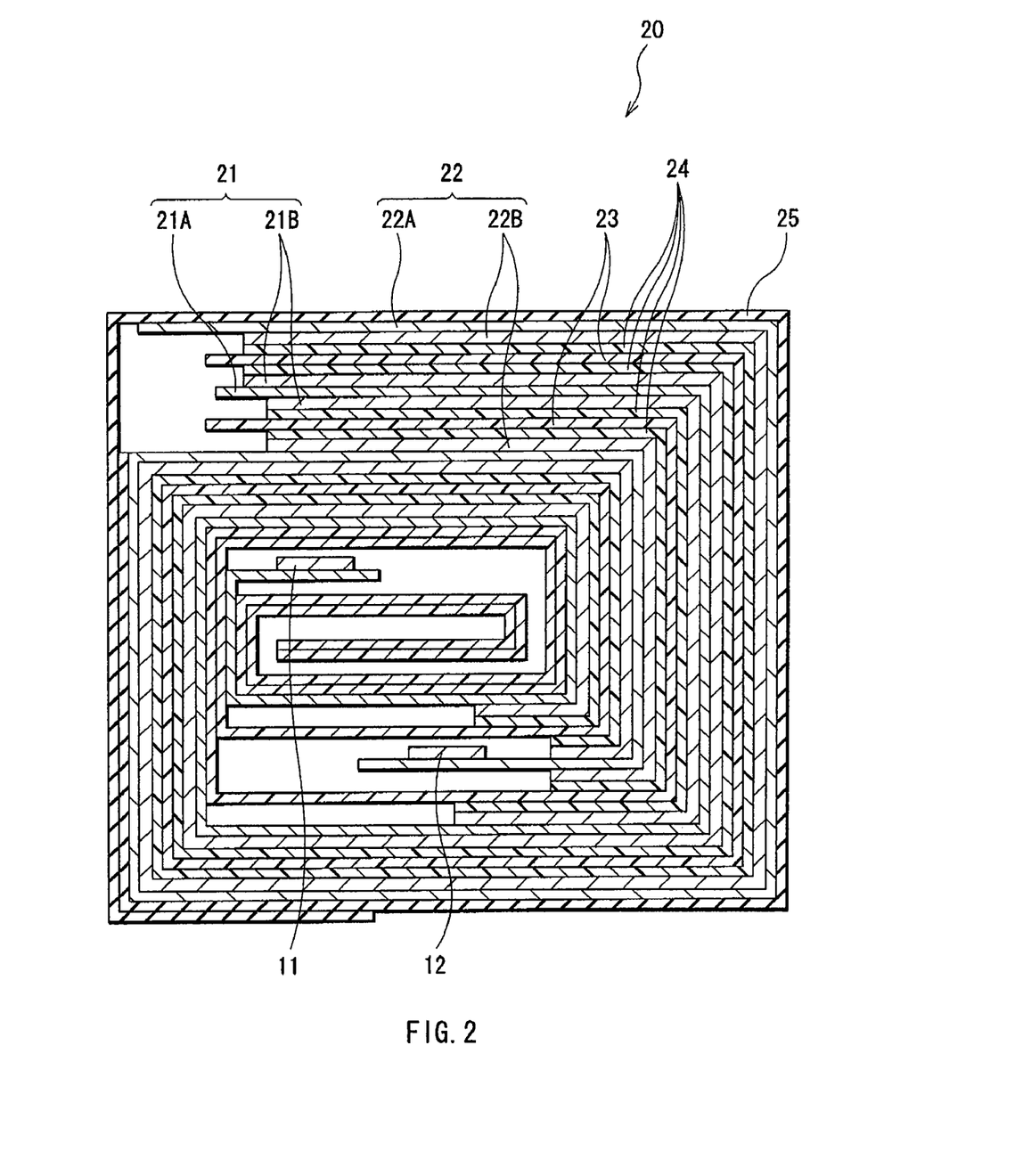
FIG. 2 is a sectional view of a spirally wound electrode body taken along a line II-II of FIG. 1.

FIG. 2 shows a sectional view of the spirally wound electrode body 20 taken along a line II-II of FIG. 1. The spirally wound electrode body 20 is a spirally wound laminate including a cathode 21 and an anode 22 with a separator 23 and an electrolyte 24 in between, and an outermost portion of the spirally wound electrode body 20 is protected with a protective tape 25.

The cathode 21 includes, for example, a cathode current collector 21A having a pair of facing surfaces and an active material layer 21B disposed on both sides of the cathode current collector 21A. The cathode current collector 21A has an exposed region where the cathode active material layer 21B is not disposed in an end portion in a longitudinal direction, and the cathode terminal 11 is attached to the exposed region. The cathode current collector 21A is made of, for example, metal foil such as aluminum foil, nickel foil or stainless foil. The cathode active material layer 21B includes, for example, one kind or two or more kinds of cathode materials capable of inserting and extracting lithium as cathode active materials, and the cathode active material layer 21B may include an electrical conductor and a binder if necessary.

Examples of the cathode materials capable of inserting and extracting lithium include a chalcogenide not including lithium such as titanium sulfide ($TiS_2$), molybdenum sulfide ($MOS_2$), niobium selenide ($NbSe_2$) or vanadium oxide ($V_2O_5$), a lithium complex oxide including lithium, a lithium-containing phosphate compound, and a polymer such as polyacetylene or polypyrrole.

Among them, a lithium complex oxide including lithium and a transition metal element and a lithium-containing phosphate compound including lithium and a transition metal element are preferable, because they can obtain a high voltage and a high energy density, and a lithium complex oxide or a lithium-containing phosphate compound including at least one kind selected from the group consisting of cobalt (Co), nickel, manganese (Mn) and iron (Fe) as the transition metal element is more preferable. The chemical formulas of the lithium complex oxide and the lithium-containing phosphate compound are represented by, for example, $Li_xMIO_2$ and $Li_yMIIPO_4$, respectively. In the formulas, MI and MII represent one or more kinds of transition metal elements. In the formulas, the values of x and y depend upon a charge-discharge state of the battery, and are generally within a range of $0.05 \leq x \leq 1.10$ and $0.05 \leq y \leq 1.10$, respectively.

Specific examples of the lithium complex oxide and the lithium-containing phosphate compound include lithium-cobalt complex oxide ($Li_xCoO_2$), lithium-nickel complex oxide ($Li_xNiO_2$), lithium-nickel-cobalt complex oxide ($Li_xNi_{1-z}Co_zO_2$ (z<1)), lithium-manganese complex oxide ($LiMn_2O_4$) having a spinel structure, a lithium-iron phosphate compound ($Li_yFePO_4$), lithium-iron-manganese phosphate compound ($Li_yFe_{1-v}Mn_vPO_4$ (v<1)) and the like.

Examples of the electrical conductor include carbon materials such as graphite, carbon black and ketjen black, and one kind or a mixture of two or more kinds selected from them is used. Moreover, in addition to the carbon materials, a metal material having conductivity, a conductive polymer material having conductivity or the like may be used. Examples of the binder include synthetic rubber such as styrene-butadiene rubber, fluorine rubber or ethylene-propylene-diene rubber, and a polymer material such as polyvinylidene fluoride, and one kind or a mixture of two or more kinds selected from them is used.

The anode 22 includes an anode current collector 22A having a pair of facing surfaces and an anode active material layer 22B disposed on both sides of the anode current collector 22A. The anode current collector 22A has an exposed region where the anode active material layer 22B is not disposed in an end portion in a longitudinal direction, and the anode terminal 12 is attached to the exposed region. The anode current collector 22A is made of, for example, metal foil such as copper foil, nickel foil or stainless foil.

The anode active material layer 22B includes, for example, one kind or two or more kinds of anode materials capable of inserting and extracting lithium as anode active materials, and the anode active material layer 22B may include an electrical conductor and a binder if necessary. As the electrical conductor and the binder, the same materials described in the cathode 21 can be used.

Examples of the anode materials capable of inserting and extracting lithium include a carbon material, a material including a metal element or a metalloid element capable of forming an alloy with lithium as an element, a metal oxide and a polymer. The examples of the carbon material include graphitizable carbon, non-graphitizable carbon having a spacing of 0.37 nm or over between (002) planes, graphite having a spacing of 0.340 nm or less between (002) planes, and graphite may be artificial graphite or natural graphite. Examples of the material including a metal element or a metalloid element capable of forming an alloy with lithium as an element include a simple substance, an alloy or a compound of a metal element capable of forming an alloy with lithium, a simple substance, an alloy or a compound of a metalloid element capable of forming an alloy with lithium, or a material including a phase including one kind or two or more kinds of them at least in part, and more specifically, a material including silicon (Si) or tin (Sn) as an element is preferable. As the metal oxide, iron oxide, ruthenium oxide or molybdenum oxide is used, and as the polymer, polyacetylene, polypyrrole or the like is used.

Moreover, in the embodiment, an agglomerated graphite material formed through agglomerating a plurality of primary particles of graphite having fine pores so that the orientation planes thereof are not parallel to each other at least in part to form secondary particles. The graphite having fine pores is preferable, because the graphite can obtain a high capacity, and can absorb a gas generated in a battery, and more specifically, because when the secondary particles are formed so that the orientation planes are not parallel to each other are used, lithium-ion acceptance characteristics can be further improved.

Providing that the length of the secondary particle in a major axis direction is A, and the length in a minor axis direction is B, in the agglomerated graphite material, the average of aspect ratio represented by A/B is preferably within a range from 1 to 4 inclusive in a discharge state. As the average aspect ratio in a region where the orientation planes of the primary particles constituting the secondary particle are nearly parallel to each other tends to increase, and the average aspect ratio in a region where the orientation planes of the primary particles are less parallel to each other tends to decrease, so when the average is 4 or less, a higher effect can be obtained. The aspect ratio can be calculated based on the length A of the secondary particle in a major axis direction and the length B in a minor axis direction estimated by, for example, a scanning electron microscope (SEM).

The specific surface area of the agglomerated graphite material is preferably 5 $m^2/g$ or less. When the specific surface area is too large, a side reaction such as decomposition of an electrolyte solution often occurs. Thereby, it is difficult to sufficiently improve the characteristics of the agglomerated graphite material. Moreover, the specific surface area of the agglomerated graphite material is preferably 1 $m^2/g$ or over. When the specific surface area is too small, the gas absorption capacity of the agglomerated graphite material declines. The specific surface area of the agglomerated graphite material can be estimated by, for example, a BET (Brunauer Emmett Teller) single point method.

Moreover, in the agglomerated graphite material, the total volume of fine pores having a diameter from 10 nm to $1\times10^5$ nm inclusive as estimated by mercury porosimetry is preferably within a range from 0.5 cm$^3$/g to 1.5 cm$^3$/g inclusive per unit weight, and the total volume of fine pores with a diameter from 10 nm to $2\times10^3$ nm inclusive estimated by mercury porosimetry is more preferably within a range from 0.1 cm$^3$/g to 0.3 cm$^3$/g inclusive per unit weight. When the agglomerated graphite material has such a fine pore distribution, the lithium-ion acceptance characteristics can be further improved, and the capacity and the cycle capacity retention ratio can be further improved.

The agglomerated graphite material can be obtained through heating a mixture of coke or the like as a filler and pitch or the like as a molding agent or a sintering agent to graphitize the mixture. In this method, the filler (coke) and binder pitch or the like are used as materials, so polycrystalline graphite can be obtained, and sulfer or nitrogen included in the materials is generated as a gas during heating, so fine pores are formed in paths where the gas passes. In addition, the agglomerated graphite material can be obtained through granulating graphite having fine pores into primary particles. Any granulating method may be used, and for example, a wet method in which the graphite is stirred and rolled through the use of a liquid including a solvent or a granulation aid or a dry method in which the graphite is rolled without any additives may be used. Further, it is more preferable to perform isotropic compression after the above-described heating process or granulating process.

The anode active material layer 22B may use only the agglomerated graphite material as the anode active material, or may use one or more kinds of other anode active materials with the agglomerated graphite material. In this case, the ratio of the agglomerated graphite material in the anode active material is preferably within a range from larger than 0 wt % to 60 wt %, and more preferably within a range from 3 wt % to 30 wt % inclusive. This is because while reducing expansion, a higher cycle capacity retention ratio can be obtained.

The separator 23 is made of, for example, an insulating thin film having high ion transmittance and a predetermined mechanical strength such as a porous film of a polyolefin-based synthetic resin such as polypropylene or polyethylene, or a porous film of an inorganic material such as ceramic nonwoven, and the separator 23 may have a structure in which two or more kinds of the porous films are laminated.

The electrolyte 24 is made of a so-called gel electrolyte in which a polymer material holds an electrolyte solution. The separator 23 may be impregnated with the electrolyte 24, or the electrolyte 24 may be arranged between the separator 23 and the cathode 21 and the anode 22.

The electrolyte solution includes, for example, a solvent and an electrolyte salt dissolved in the solvent. Examples of the solvent include a lactone-based solvent such as γ-butyrolactone, γ-valerolactone, δ-valerolactone, or ε-caprolactone, a carbonate-based solvent such as ethylene carbonate, propylene carbonate, butylene carbonate, vinylene carbonate, dimethyl carbonate, ethyl methyl carbonate or diethyl carbonate, an ether-based solvent such as 1,2-dimethoxyethane, 1-ethoxy-2-methoxyethane, 1,2-diethoxyethane, tetrahydrofuran or 2-methyltetrahydrofuran, a nitrile-based solvent such as acetonitrile, a sulfolane-based solvent, phosphoric acids, a phosphate solvent, and nonaqueous solvents such as pyrrolidones. As the solvent, one kind or a mixture of two or more kinds selected from them may be used.

As the electrolyte salt, any salts which are dissolved in the solvent and generate ions may be used, and one kind or a mixture of two or more kinds selected from the salts may be used. Examples of lithium salts include lithium hexafluorophosphate (LiPF$_6$), lithium tetrafluoroborate (LiBF$_4$), lithium hexafluoroarsenate (LiAsF$_6$), lithium perchlorate (LiClO$_4$), lithium trifluoromethanesulfonate (LiCF$_3$SO$_3$), lithium bis(trifluoromethanesulfonyl)imide (LiN(SO$_2$CF$_3$)$_2$), lithium tris(trifluoromethanesulfonyl)methyl (LiC(SO$_2$CF$_3$)$_3$), lithium tetrachloroaluminate (LiAlCl$_4$), lithium hexafluorosilicate (LiSiF$_6$) and so on.

As the polymer, a copolymer of vinylidene fluoride including a unit represented by Chemical Formula 1 such as polyvinylidene fluoride or a copolymer of vinylidene fluoride and hexafluoropropylene is preferable, because oxidation-reduction stability is high.

[Chemical Formula 1]

Moreover, as the polymer, a polymer formed through polymerizing a polymerizable compound is cited. Examples of the polymerizable compound include a polymerizable compound including a group in which hydrogen in a vinyl group or a part of the vinyl group is replaced with a replacement group such as a methyl group. More specifically, monofunctional acrylate such as acrylic ester, monofunctional methacrylate such as methacrylic ester, polyfunctional acrylate such as diacrylic ester or triacrylic ester, polyfunctional methacrylate such as dimethacrylic ester or trimethacrylic ester, acrylonitrile and methacrylonitrile, and among them, an ester including an acrylate group or a methacrylate group is preferable, because polymerization proceeds easily, and the reaction rate of the polymerizable compound is high. Moreover, as the polymerizable compound, a polymerizable compound not including an ester group is preferable, because when an ester group is included in the polymerizable compound, lithium ions is coordinated in the ester group, thereby ion conductivity declines. Examples of such a polymer include polyacrylic ester including a unit represented by Chemical Formula 2, polymethacrylic ester, polyacrylonitrile and polymethacrylonitrile.

[Chemical Formula 2]

(where R1 represents C$_j$H$_{2j-1}$O$_k$, and the values of j and k are integers within a range of $1 \leq j \leq 8$ and $0 \leq k \leq 4$.)

One of the polymerizable compounds may be solely used; however, a mixture of a monofunctional body and a polyfunctional body, one polyfunctional body, or a mixture of two or more kinds of polyfunctional bodies is preferably used, because with such a structure, the mechanical strength and the electrolyte solution holding capacity of the polymer formed by polymerization easily become compatible.

Moreover, a polymer having a structure in which at least one kind selected from the group consisting of polyvinylacetal and its derivatives is polymerized is preferable.

Polyvinylacetal is a compound in which a repeating unit includes an acetal group represented by Chemical Formula 3(1), a unit including a hydroxyl group represented by Chemical Formula 3(2) and a unit including an acetyl group represented by Chemical Formula 3(3). More specifically, for example, polyvinyl formal in which R2 shown in Chemical Formula 3(1) is hydrogen or polyvinyl butyral in which R2 is a propyl group is cited.

[Chemical Formula 3]

(where R2 is a hydrogen atom or an alkyl group of carbon number 1 to 3.)

The ratio of an acetal group in polyvinylacetal is preferably within a range from 60 mol % to 80 mol % inclusive, because within the range, the solubility with a solvent can be improved, and the stability of an electrolyte can be further improved. Moreover, the weight-average molecular weight of polyvinylacetal is preferably within a range from 10000 to 500000 inclusive, because when the molecular weight is too low, it is difficult to proceed a polymerization reaction, and when the molecular weight is too high, the viscosity of the electrolyte solution is increased.

The polymer may be formed through polymerizing only polyvinylacetal or only one kind selected from its derivatives, or polymerizing two or more kinds selected from polyvinylacetal and its derivatives, and the polymer may be a copolymer of polyvinylacetal and a monomer except for the derivatives. Further, the polymer may be formed through using a cross-linking agent for polymerization.

As the electrolyte 24, a liquid electrolyte may be used in an as-is state without holding an electrolyte solution by the polymer. In this case, the separator 23 is impregnated with the electrolyte solution.

For example, the secondary battery can be manufactured through the following steps.

At first, the cathode active material layer 21B is formed on the cathode current collector 21A so as to form the cathode 21. The cathode active material layer 21B is formed through the following steps. The powder of the cathode active material, an electrical conductor and a binder are mixed to form a cathode mixture, and then the cathode mixture is dispersed in a solvent such as N-methyl-2-pyrrolidone to form paste-form cathode mixture slurry. The cathode mixture slurry is applied to the cathode current collector 21A, and the cathode mixture slurry is dried, and compression molded, thereby the cathode active material layer 21B is formed. Moreover, as in the case of the cathode 21, the anode 22 is formed through forming the anode active material layer 22B on the anode current collector 22A.

Next, the cathode terminal 11 is attached to the cathode current collector 21A, and the anode terminal 12 is attached to the anode current collector 22A. The cathode 21 and the anode 22 are laminated with the separator 23 in between to form a laminate, and the laminate is spirally wounded in a longitudinal direction, and the protective tape is adhered to an outermost portion of the laminate so as to form a spirally wound body as a precursor body of the spirally wound electrode body 20. After that, the spirally wound body is sandwiched between the package members 30, and the edge portions of the package members 30 except for one side are adhered by thermal fusion bonding, and an electrolyte composite including an electrolyte solution and a monomer as the materials of polymer is injected into the package members 30. Next, after the edge portions of the package members 30 on the remaining side are adhered by thermal fusion bonding to enclose the electrolyte composite in the package members 30, the monomer is polymerized so as to form the electrolyte 24. Thereby, the secondary battery shown in FIGS. 1 and 2 is obtained.

Moreover, instead of injecting the electrolyte composite into the package members 30, and polymerizing the monomer so as to form the electrolyte 24, after the cathode 21 and the anode 22 is formed, the electrolyte 24 including the electrolyte solution and the polymer is formed on the cathode 21 and the anode 22, and they are spirally wound with the separator 23 in between, and they may be enclosed in the package members 30.

Further, in the case where the electrolyte solution is used as the electrolyte 24, after the spirally wound body is formed as described above, and the spirally wound body is sandwiched between the package members 30, the electrolyte solution is injected into the package members 30, and the package members 30 are sealed.

When the secondary battery is charged, lithium ions are extracted from the cathode 21, and are inserted into the anode 22 through the electrolyte solution. On the other hand, when the secondary battery is discharged, for example, lithium ions are extracted from the anode 22, and are inserted into the cathode 21 through the electrolyte solution. In this case, the above-described agglomerated graphite material is included in the anode active material layer 22B, so a high capacity can be obtained, and a generated gas is absorbed to reduce expansion.

Thus, in the embodiment, the secondary particles are formed through agglomerating primary particles so that the orientation planes thereof are not parallel to each other, and an agglomerated graphite material in which the total volume of fine pores with a diameter from 10 nm to $1 \times 10^5$ nm inclusive is within a range from 0.5 cm$^3$/g to 1.5 cm$^3$/g inclusive is included, so the capacity can be improved, and a gas generated by a side reaction or the like can be absorbed to reduce expansion.

In particular, when the ratio of the agglomerated graphite material in the anode active material is 60 wt % or less, while reducing expansion, the cycle capacity retention ratio can be improved.

Moreover, when the total volume of fine pores with a diameter from 10 nm to $2 \times 10^3$ nm inclusive is within a range from 0.1 cm$^3$/g to 0.3 cm$^3$/g inclusive, when the average of the aspect ratios A/B of the secondary particles is 4 or less, or when the specific surface area of the agglomerated graphite material is 5 m²/g or less, a higher effect can be obtained.

EXAMPLES

Specific examples be described below.

Examples 1-1 to 1-5

Secondary batteries using film-shaped package members shown in FIGS. 1 and 2 were formed.

At first, 0.5 mol of lithium carbonate and 1 mol of cobalt carbonate were mixed to form a mixture, and the mixture was fired in air at 900° C. for 5 hours to synthesize lithium-cobalt complex oxide ($LiCoO_2$) as a cathode active material. Next, 85 wt % of lithium-cobalt complex oxide powder, 5 wt % of artificial graphite as an electrical conductor and 10 wt % of polyvinylidene fluoride as a binder were mixed to form a cathode mixture, and then the cathode mixture was dispersed in N-methyl-2-pyrrolidone as a solvent to form cathode mixture slurry. Next, after the cathode mixture slurry was applied to both sides of the cathode current collector 21A made of aluminum foil with a thickness of 20 μm, and was dried, the cathode mixture slurry was compression molded so as to form the cathode active material layer 21B, thereby the cathode 21 was formed. After that, the cathode terminal 11 was attached to the cathode 21.

Moreover, 50 parts by weight of coke powder with an average particle size of 10 μm, 15 parts by weight of pitch, 10 parts by weight of silicon carbonate (a volatile temperature of 2500° C. to 3000° C.), and 10 parts by weight of coal tar were mixed, and stirred at 200° C. for one hour to form a mixture. Next, the mixture was pulverized into particles with an average particle size of 20 μm, and the particles were put into a mold, and press molded to form a graphite precursor molded body with a rectangular parallelepiped of 15 mm×25 cm×6 cm. After the graphite precursor molded body was heated at 1000° C. or over in a nitrogen atmosphere, the graphite precursor molding body was further heated at approximately 3000° C. in a nitrogen atmosphere to form an agglomerated graphite material. At that time, the fine pore distribution, the specific surface area and the aspect ratio A/B of the agglomerated graphite material in each of Examples 1-1 through 1-5 were changed by changing the heating temperature and the heating time. The fine pore distributions, the specific surface areas and the aspect ratios A/B of the formed agglomerated graphite materials are shown in Table 1. The fine pore distribution was measured by mercury porosimetry, and the specific surface area was measured by a BET single point method using nitrogen and a mixed gas of nitrogen and nitrogen helium as a carrier and a reference, and the aspect ratio A/B was measured through randomly sampling and measuring ten fine pores by a SEM, and calculating the average.

Moreover, when the agglomerated graphite materials of Examples 1-1 through 1-5 were analyzed by an X-ray diffraction method, it was confirmed that all of the agglomerated graphite materials were graphite. Further, when the sections of the agglomerated graphite materials were revealed by a focused ion beam, and the sections were observed by a transmission electron microscope, it was confirmed that in each of the agglomerated graphite materials, the secondary particles were formed through agglomerating a plurality of primary particles, and at least in a part of the primary particles, the orientation of hexagonal planes were not parallel to each other.

Each of the agglomerated graphite materials was used as an anode active material, and 95 wt % of the anode active material and 5 wt % of polyvinylidene fluoride as a binder were mixed to form an anode mixture, and then the anode mixture was dispersed in N-methyl-2-pyrrolidone as a solvent to form anode mixture slurry. Next, after the anode mixture slurry was applied to both sides of the anode current collector 22A made of copper foil with a thickness of 15 μm, and was dried, the anode mixture slurry was compression molded to form the anode active material layer 22B, thereby the anode 22 was formed. It was confirmed in an electron micrograph of a sectional structure of the anode active material layer 22B that in the agglomerated graphite material, the secondary particles were formed by agglomerating a plurality of primary particles so that the orientation planes thereof were not parallel to each other.

Next, after the anode terminal 12 was attached to the anode 22, the formed cathode 21 and the formed anode 22 were adhered to each other with the separator 23 made of a microporous polyethylene film with a thickness of 25 μm in between, and they were spirally wound in a longitudinal direction so as to form a spirally wound body. After that, the formed spirally wound body was put between the package members 30, and then the edge portions of the package members 30 except for one side were adhered by thermal fusion bonding. As the package members 30, moisture-proof aluminum laminate films formed through laminating a nylon film with a thickness of 25 μm, aluminum foil with a thickness of 40 μm and a polypropylene film with a thickness of 30 μm were used.

Next, an electrolyte solution formed through dissolving 1 mol/l of lithium hexafluorophosphate in a mixed solvent of ethylene carbonate and diethyl carbonate at a weight ratio of 3:7 was injected into the package members 30, and the edge portions of the package members 30 on the remaining side were adhered by thermal fusion bonding to obtain each of the secondary batteries.

As Comparative Example 1-1 relative to Examples 1-1 through 1-5, a secondary battery was formed as in the case of Examples 1-1 through 1-5, except that instead of the agglomerated graphite material, artificial graphite particles which were not granulated were used as the anode active material. As Comparative Examples 1-2 and 1-3, secondary batteries were formed as in the case of Examples 1-1 through 1-5, except that agglomerated graphite materials of which the fine pore distribution, the specific surface area and the aspect ratio A/B were changed by changing the heating temperature, the composition ratio of materials and the time at the time of graphitization. As in the case of Examples 1-1 through 1-5, the fine pore distributions, the specific surface areas and the aspect ratios A/B of the artificial graphite particles of Comparative Example 1-1 and the agglomerated graphite materials of Comparative Examples 1-2 through 1-3 were measured. The results are also shown in Table 1. In the artificial graphite used in Comparative Example 1-1, fine pores with a diameter from 10 nm to $1 \times 10^5$ nm inclusive were not measured, and the specific surface area and the aspect ratio A/B of the primary particle were measured.

The secondary batteries of Examples 1-1 through 1-5 and Comparative Examples 1-1 through 1-3 were charged and discharged at 23° C., and the rated capacities and the discharge capacity retention ratios in the 300th cycle were determined. The secondary batteries were charged at a constant current of 100 mA and a constant voltage until reaching an upper limit of 4.2 V for 15 hours, and then the secondary batteries were discharged at a constant current of 100 mA until reaching an end voltage of 2.5 V. Providing that the rated capacity was a discharge capacity in the first cycle, the discharge capacity in the 300th cycle was determined by the ratio of the discharge capacity in the 300th cycle to the rated capacity (discharge capacity in the 300th cycle/rated capacity)×100.

Moreover, after the thickness of each of the secondary batteries which were separately subjected to initial charge and discharge under the above-described conditions was measured, the secondary batteries were charged until reaching 4.31 V for 3 hours, and were kept in a constant temperature bath at 60° C. for 1 month. Then, the thickness of each of the secondary batteries after the keeping was measured. The expansion of each of the secondary batteries after the keeping was calculated by the subtraction of the thickness of the secondary battery before the keeping from the thickness of the secondary battery after the keeping. The obtained results are shown in Table 1.

a diameter from 10 nm to $2 \times 10^3$ nm inclusive was more preferably within a range from 0.1 $cm^3/g$ to 0.3 $cm^3/g$ inclusive.

Examples 2-1 to 2-18

Secondary batteries were formed as in the case of Example 1-3, except that a mixture of the agglomerated graphite material and mesocarbon microbead which was an artificial graphite or natural graphite was used. In other words, as the properties of the agglomerated graphite material, as in the case of Example 1-3, the total volume of fine pores with a diameter from 10 nm to $1 \times 10^5$ nm inclusive was 1.0 $cm^3/g$, the total volume of fine pores with a diameter from 10 nm to $2 \times 10^3$ nm inclusive was 0.2 $cm^3/g$, the specific surface area was 3.5 $m^2/g$, and the average of the aspect ratios A/B of the secondary particles was 2.1. The mixture ratio of the agglomerated graphite material and another anode active material was changed in Examples 2-1 through 2-18 as shown in Table 2.

TABLE 1

| | ANODE ACTIVE MATERIAL | | | | | DISCHARGE | |
| --- | --- | --- | --- | --- | --- | --- | --- |
| | | VOLUME OF FINE PORE ($cm^3/g$) | | SPECIFIC SURFACE | | | CAPACITY RETENTION |
| | MATERIAL | $10 - 10^5$ (nm) | $10 - 2 \times 10^3$ (nm) | AREA ($m^2/g$) | A/B | RATED CAPACITY (mAh) | RATIO (%) | EXPANSION (mm) |
| EXAMPLE 1-1 | AGGLOMERATED | 1.5 | 0.4 | 4.9 | 3.8 | 760 | 75 | 0.8 |
| EXAMPLE 1-2 | GRAPHITE | 1.5 | 0.3 | 4.7 | 2.7 | 762 | 80 | 0.5 |
| EXAMPLE 1-3 | MATERIAL | 1.0 | 0.2 | 3.5 | 2.1 | 768 | 79 | 0.1 |
| EXAMPLE 1-4 | | 0.5 | 0.1 | 4.1 | 2.8 | 761 | 79 | 0.3 |
| EXAMPLE 1-5 | | 0.5 | 0.07 | 4.2 | 3.5 | 754 | 75 | 0.6 |
| COMPARATIVE EXAMPLE 1-1 | ARTIFICIAL GRAPHITE | — | — | 0.7 | 1.2 | 746 | 58 | 2.6 |
| COMPARATIVE EXAMPLE 1-2 | AGGLOMERATED GRAPHITE | 2 | 0.5 | 5.2 | 4.2 | 753 | 71 | 1.6 |
| COMPARATIVE EXAMPLE 1-3 | MATERIAL | 0.4 | 0.07 | 4.0 | 4.4 | 756 | 72 | 1.2 |

It can be seen from Table 1 that in Examples 1-1 through 1-5, compared to Comparative Examples 1-1 through 1-3, the rated capacity was equivalent or higher, and the discharge capacity retention ratio was improved, and the expansion was smaller. In other words, it was found out that when the agglomerated graphite material in which the total volume of fine pores with a diameter from 10 nm to $1 \times 10^5$ nm inclusive was within a range from 0.5 $cm^3/g$ to 1.5 $cm^3/g$ inclusive was used, a higher capacity could be obtained, and the cycle characteristics could be improved, and the expansion could be reduced. Moreover, it was found out that the average of the aspect ratios A/B of the secondary particles was preferably 4 or less, and the specific surface area of the agglomerated graphite material was preferably 5 $m^2/g$ or less.

Moreover, it was obvious from the comparison between Examples 1-1 through 1-5 that there was a tendency that as the total volume of fine pores with a diameter from 10 nm to $2 \times 10^3$ un inclusive was reduced, the rated capacity and the cycle characteristics were improved, and then declined, and the expansion was reduced, and then increased. In other words, it was found out that the total volume of fine pores with The specific surface area of the mesocarbon microbead used in Examples 2-1 through 2-9 was 0.7 $m^2/g$, and the aspect ratio A/B of the mesocarbon microbead was 1.1. The specific surface area of the natural graphite used in Examples 2-10 to 2-18 was 4 $m^2/g$, and the aspect ratio A/B of the natural graphite was 7. They were all the values of the primary particle, and the fine pores with a diameter from 10 nm to $1 \times 10^5$ nm inclusive in the natural graphite and the mesocarbon microbead were not measured.

Moreover, as Comparative Example 2-1 relative to Examples 2-1 through 2-18, a secondary battery was formed as in the case of Example 1-3, except that instead of the agglomerated graphite material, natural graphite was used as the anode active material. The natural graphite was the same as the natural graphite used in Examples 2-10 through 2-18.

The rated capacities, the discharge capacity retention ratios in the 300th cycle, and the expansion after the keeping of the secondary batteries of Examples 2-1 through 2-18 and Comparative Example 2-1 were determined. The obtained results are shown in Table 2 together with the results of Example 1-3 and Comparative Example 1-1.

TABLE 2

| | ANODE ACTIVE MATERIAL | | | | | |
| --- | --- | --- | --- | --- | --- | --- |
| | MIXTURE RATIO OF AGGLOMERATED GRAPHITE MATERIAL (WT %) | OTHER MATERIAL KIND | MIXTURE RATIO (WT %) | RATED CAPACITY (mAh) | DISCHARGE CAPACITY RETENTION RATIO (%) | EXPANSION (mm) |
| EXAMPLE 1-3 | 100 | — | — | 768 | 79 | 0.1 |
| EXAMPLE 2-1 | 0.8 | MCMB | 99.2 | 748 | 80 | 2.2 |
| EXAMPLE 2-2 | 1.0 | | 99.0 | 753 | 83 | 1.6 |
| EXAMPLE 2-3 | 2.5 | | 97.5 | 756 | 84 | 1.3 |
| EXAMPLE 2-4 | 3 | | 97 | 763 | 87 | 0.9 |
| EXAMPLE 2-5 | 5 | | 95 | 766 | 89 | 0.5 |
| EXAMPLE 2-6 | 30 | | 70 | 768 | 88 | 0.5 |
| EXAMPLE 2-7 | 32 | | 68 | 767 | 85 | 0.5 |
| EXAMPLE 2-8 | 60 | | 40 | 763 | 83 | 0.4 |
| EXAMPLE 2-9 | 63 | | 37 | 758 | 80 | 0.4 |
| EXAMPLE 2-10 | 0.8 | NATURAL | 99.2 | 755 | 79 | 0.8 |
| EXAMPLE 2-11 | 1.0 | GRAPHITE | 99.0 | 762 | 81 | 0.6 |
| EXAMPLE 2-12 | 2.5 | | 97.5 | 763 | 81 | 0.6 |
| EXAMPLE 2-13 | 3 | | 97 | 768 | 83 | 0.4 |
| EXAMPLE 2-14 | 5 | | 95 | 769 | 85 | 0.3 |
| EXAMPLE 2-15 | 30 | | 70 | 766 | 84 | 0.2 |
| EXAMPLE 2-16 | 32 | | 68 | 761 | 82 | 0.4 |
| EXAMPLE 2-17 | 60 | | 40 | 760 | 82 | 0.4 |
| EXAMPLE 2-18 | 63 | | 37 | 759 | 80 | 0.5 |
| COMPARATIVE EXAMPLE 1-1 | — | ARTIFICIAL GRAPHITE | 100 | 746 | 58 | 2.6 |
| COMPARATIVE EXAMPLE 2-1 | — | NATURAL GRAPHITE | 100 | 755 | 6 | 1.0 |

MCMB; mesocarbon microbead

It can be seen from Table 2 that in Examples 2-1 through 2-12 in which another material was mixed as the anode active material, as in the case of Example 1-3, the rated capacity was equivalent or higher, the discharge capacity retention ratio could be improved, and the expansion could be reduced. Moreover, there was a tendency that as the content of the agglomerated graphite material increased, the discharge capacity retention ratio was improved, and then declined. In other words, it was determined that the ratio of the agglomerated graphite material in the anode active material was preferably within a range of larger than 0 wt % to 60 wt %, and more preferably within a range from 3 wt % to 30 wt %.

Examples 3-1 through 3-6

Secondary batteries were formed as in the case of Example 2-2, except that instead of the electrolyte solution, the gel electrolyte 24 in which a polymer held an electrolyte solution was used. In other words, as the anode active material, a mixture of 50 wt % of the agglomerated graphite material and 50 wt % of mesocarbon microbead was used. In Example 3-1, the electrolyte 24 was formed through applying a mixed solvent in which a copolymer of vinylidene fluoride and hexafluoropropylene and an electrolyte solution were dissolved to the cathode 21 and the anode 22, and volatilizing the mixed solvent. As the electrolyte solution, an electrolyte solution in which 1 mol/l of lithium hexafluorophosphate was dissolved in a solvent formed through mixing 60 wt % of ethylene carbonate and 40 wt % of propylene carbonate was used.

In Example 3-2, as the polymerizable compound, a polymerizable compound having three compositions a, b and c shown in Chemical Formula 4 at a molar ratio of a:b:c=2:3:5 was used, and the polymerizable compound was mixed with the electrolyte solution to form a mixture, and the mixture was injected into the package members 30, and then the polymerizable compound was polymerized to form the electrolyte 24. The composition of the electrolyte solution was the same as that in Example 2-2, and the electrolyte solution was formed through dissolving 1 mol/l of lithium hexafluorophosphate in a solvent formed through mixing ethylene carbonate and diethyl carbonate at a weight ratio of ethylene carbonate:diethyl carbonate=3:7.

[Chemical Formula 4]

In Example 3-3, as the polymerizable compound, trimethylolpropane triacrylate shown in Chemical Formula 5 and neopentylglycol diacrylate shown in Chemical Formula 6 were used at a weight ratio of 3:7, and they were mixed with the electrolyte solution to form a mixture. Then, the mixture was injected into the package members 30, and the polymerizable compound was polymerized to form the electrolyte 24. The composition of the electrolyte solution was the same as that in Example 2-2.

[Chemical Formula 5]

$$CH_3-CH_2-C+CH_2-O-\underset{\underset{O}{\|}}{C}-CH=CH_2)_3$$

[Chemical Formula 6]

$$CH_2=CH-\underset{\underset{O}{\|}}{C}-O-CH_2-\underset{\underset{CH_3}{|}}{\overset{CH_3}{C}}-CH_2-O-\underset{\underset{O}{\|}}{C}-CH=CH_2$$

the electrolyte solution was injected to form the electrolyte 24. The composition of the electrolyte solution was the same as that in Example 2-2.

In Example 3-6, polyvinyl formal and the electrolyte solution were mixed to form a mixture, and the mixture was injected into the package members 30. Then, polyvinyl formal was polymerized to form the electrolyte 24. The composition of the electrolyte solution was the same as that in Example 2-2.

As Comparative Examples 3-1 through 3-6 relative to Examples 3-1 through 3-6, secondary batteries were formed as in the case of Examples 3-1 through 3-6, except that the same artificial graphite as that in Comparative Example 1-1 was used as the anode active material.

The rated capacities, the discharge capacity retention ratios in the 300th cycle and the expansion after the keeping of the secondary batteries of Examples 3-1 through 3-6 and Comparative Examples 3-1 through 3-6 were determined. The obtained results are shown in Table 3.

TABLE 3

| | ANODE ACTIVE MATERIAL | POLYMER ELECTROLYTE | RATED CAPACITY (mAh) | DISCHARGE CAPACITY RETENTION RATIO (%) | EXPANSION (mm) |
|---|---|---|---|---|---|
| EXAMPLE 3-1 | AGGLOMERATED GRAPHITE MATERIAL + MCMB | VINYLIDENE FLUORIDE COPOLYMER (APPLIED TO ELECTRODE) | 760 | 80 | 0.2 |
| EXAMPLE 3-2 | | CHEMICAL FORMULA 4 | 762 | 86 | 0.2 |
| EXAMPLE 3-3 | | CHEMICAL FORMULA 5 + CHEMICAL FORMULA 6 | 763 | 86 | 0.2 |
| EXAMPLE 3-4 | | CHEMICAL FORMULA 7 | 763 | 86 | 0.2 |
| EXAMPLE 3-5 | | POLYVINYLIDENE FLUORIDE (APPLIED TO SEPARATOR) | 764 | 85 | 0.2 |
| EXAMPLE 3-6 | | POLYVINYL FORMAL POLYMER | 765 | 87 | 0.2 |
| COMPARATIVE EXAMPLE 3-1 | ARTIFICIAL GRAPHITE | VINYLIDENE FLUORIDE COPOLYMER (APPLIED TO ELECTRODE) | 741 | 55 | 2.5 |
| COMPARATIVE EXAMPLE 3-2 | | CHEMICAL FORMULA 4 | 743 | 54 | 2.4 |
| COMPARATIVE EXAMPLE 3-3 | | CHEMICAL FORMULA 5 + CHEMICAL FORMULA 6 | 742 | 53 | 2.6 |
| COMPARATIVE EXAMPLE 3-4 | | CHEMICAL FORMULA 7 | 744 | 55 | 2.3 |
| COMPARATIVE EXAMPLE 3-5 | | POLYVINYLIDENE FLUORIDE (APPLIED TO SEPARATOR) | 746 | 58 | 2.1 |
| COMPARATIVE EXAMPLE 3-6 | | POLYVINYL FORMAL POLYMER | 745 | 59 | 2.1 |

MCMB; mesocarbon microbead

In Example 3-4, as the polymerizable compound, a compound shown in Chemical Formula 7 was used, and the compound was mixed with the electrolyte solution to form a mixture. Then, the mixture was injected into the package members 30, and then the polymerizable compound polymerized to form the electrolyte 24. The composition of the electrolyte solution was the same as that in Example 2-2.

[Chemical Formula 7]

In Example 3-5, polyvinylidene fluoride was applied to the surface of the separator 23, and a spirally wound body was formed, and was contained in the package members 30. Then, It was obvious from Table 3 that in Examples 3-1 through 3-6, compared to Comparative Examples 3-1 through 3-6, the rated capacity and the discharge capacity retention ratio were improved, and the expansion was reduced. In other words, it was determined that in the case where a so-called gel electrolyte 24 was used, the same effects could be obtained.

In the embodiment and the examples, the description is given to a battery including the anode 22 formed through the use of an agglomerated graphite material in which a plurality of primary particles made of graphite having fine pores are agglomerated so that the orientation planes thereof are not parallel to each other at least in part to form the secondary particles, and the total volume of fine pores with a diameter of 10 nm to $1\times10^5$ nm inclusive estimated by mercury porosimetry is within a range from 0.5 cm$^3$/g to 1.5 cm$^3$/g inclusive per unit weight. However, even if a battery is formed without using the agglomerated graphite material, the agglomerated graphite material may be included at the time of forming the battery or using the battery.

Moreover, in the embodiment and the examples, the case where the electrolyte solution is used as the electrolyte, and the case where the gel electrolyte in which the polymer holds the electrolyte solution is used are described. However, any other electrolyte may be used. Examples of the other electrolytes include an organic solid electrolyte formed through dissolving or dispersing an electrolyte salt in a polymer having ionic conductivity, and an inorganic solid electrolyte including an ion conductive inorganic compound such as ion conductive ceramic, ion conductive glass or ionic crystal.

Moreover, in the embodiment and the examples, the case where the spirally wound electrode body including the cathode 21 and the anode 22 is included in the package members 30 is described. However, a laminate including one cathode 21 and one anode 22 or a laminate including a plurality of cathodes 21 and a plurality of anodes 22 may be included.

Furthermore, in the embodiment and the examples, the battery using lithium as an electrode reactant is described. However, any other alkali metal such as sodium (Na) or potassium (K), alkali earth metal such as magnesium or calcium (Ca), any other light metal such as aluminum may be used in the invention. In addition, the embodiments are applicable to not only secondary batteries but also any other batteries such as primary batteries in a similar manner.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode active material comprising:
an agglomerated graphite material in which a plurality of primary particles made of graphite having fine pores are agglomerated so that the orientation planes thereof are not parallel to each other, at least in part, to form secondary particles, and in which the total volume of fine pores with a diameter from 10 nm to $1\times10^5$ nm inclusive as estimated by mercury porosimetry ranges from 0.5 $cm^3/g$ to 1.5 $cm^3/g$ inclusive per unit weight,
wherein the content of the agglomerated graphite material in the anode active material ranges from 3 wt % to 30 wt %.

2. The anode active material according to claim 1, wherein in the agglomerated graphite material, the total volume of fine pores with a diameter from 10 nm to $2\times10^3$ nm inclusive as estimated by mercury porosimetry ranges from 0.1 $cm^3/g$ to 0.3 $cm^3/g$ inclusive.

3. The anode active material according to claim 1, wherein when the length of the secondary particle in a major axis direction is represented by A, and the length in a minor axis direction is represented by B, the average of aspect ratio represented by A/B is 4 or less.

4. The anode active material according to claim 1, wherein a specific surface area of the agglomerated graphite material is 5 $m^2/g$ or less.

5. A battery comprising:
a cathode;
an anode; and
an electrolyte,
wherein the anode includes an anode active material including an agglomerated graphite material as an anode active material, the agglomerated graphite material in which a plurality of primary particles made of graphite having fine pores are agglomerated so that the orientation planes thereof are not parallel to each other, at least in part, to form secondary particles, and
wherein in the agglomerated graphite material, the total volume of fine pores with a diameter ranging from 10 nm to $1\times10^5$ nm inclusive as estimated by mercury porosimetry ranges from 0.5 $cm^3/g$ to 1.5 $cm^3/g$ inclusive per unit weight, and
wherein the content of the agglomerated graphite material in the anode active material ranges from 3 wt % to 30 wt %.

6. The battery according to claim 5, wherein the cathode, the anode and the electrolyte are contained in a film-shaped package member.

7. The battery according to claim 5, wherein in the agglomerated graphite material, the total volume of fine pores with a diameter ranging from 10 nm to $2\times10^3$ nm inclusive as estimated by mercury porosimetry ranges from 0.1 $cm^3/g$ to 0.3 $cm^3/g$ inclusive.

8. The battery according to claim 5, wherein when the length of the secondary particle in a major axis direction is represented by A, and the length in a minor axis direction is represented by B, the average of aspect ratio represented by A/B is 4 or less.

9. The battery according to claim 5, wherein the specific surface area of the agglomerated graphite material is 5 m2/g or less.

10. The battery according to claim 5, wherein the electrolyte includes an electrolyte solution and a polymer including vinylidene fluoride.

11. The battery according to claim 5, wherein the electrolyte includes an electrolyte solution and a polymer having a structure in which a polymerizable compound having an acrylate group or a methacrylate group is polymerized.

12. The battery according to claim 5, wherein the electrolyte includes an electrolyte solution and a polymer having a structure in which at least one kind selected from the group consisting of polyvinylacetal and its derivatives is polymerized.

13. The anode active material according to claim 1, wherein the anode active material includes, in addition to the agglomerated graphite material, an element selected from the group consisting of: a mesocarbon microbead and a natural graphite.

14. The battery according to claim 5, wherein the anode active material includes, in addition to the agglomerated graphite material, an element selected from the group consisting of: a mesocarbon microbead and a natural graphite.

* * * * *